Aug. 22, 1950     A. J. RUIZ ET AL     2,519,402
ROTOZONE DEFLECTION TRAINER

Filed Nov. 4, 1944     3 Sheets-Sheet 1

Inventor
ALFONSO J. RUIZ
SYDNEY C. JAMIESON
By W Glenn Jones
Attorney

Aug. 22, 1950   A. J. RUIZ ET AL   2,519,402
ROTOZONE DEFLECTION TRAINER

Filed Nov. 4, 1944   3 Sheets-Sheet 2

Inventor
ALFONSO J RUIZ
SYDNEY C JAMIESON

By W Glenn Jones

Attorney

Aug. 22, 1950     A. J. RUIZ ET AL     2,519,402
ROTOZONE DEFLECTION TRAINER
Filed Nov. 4, 1944     3 Sheets-Sheet 3

Inventor
**ALFONSO J RUIZ
SYDNEY C JAMIESON**

By W. Glenn Jones

Attorney

Patented Aug. 22, 1950

2,519,402

UNITED STATES PATENT OFFICE 2,519,402

"ROTOZONE" DEFLECTION TRAINER

Alfonso J. Ruiz, Corpus Christi, Tex., and Sydney C. Jamieson, United States Navy Application November 4, 1944, Serial No. 562,008

11 Claims. (Cl. 35—25)

(Granted under the act of March 3, 1883, as amended April 30, 1928; 370 O. G. 757)

This invention relates to devices for teaching purposes and more especially to a device with which to teach fixed gunnery deflection and range estimation in connection with aircraft.

Fighter planes are usually piloted by one man who has to fly his plane efficiently in combat action, and at the same time accomplish the primary purpose of his mission, that is, to hit enemy planes with bullets. Effectively to hit the enemy with bullets, the pilot must first recognize the enemy and then he must know when to fire, and where to fire at the enemy. Since the manipulation of a fighter plane itself takes considerable attention, it is a requisite that the pilot be able to solve these problems of when to fire and where to fire almost instanteously. This has nearly been attained by the employ of the Mark VIII gun sight. However, skill in the use of this sight can only be acquired through a thorough knowledge of the sight in use and actual practice.

It is an object of the present invention to provide apparatus with which a problem in fixed gunnery simulating that which would be met in actual flight may be set up to enable a student pilot to practice the solution of the problem with the identical gun sight he would normally employ in flight and to illustrate visually his mistakes or successes.

There are in fixed gunnery two separate and distinct problems involved, and an inaccurate solution of either one will result in a miss and perhaps in misfortune to the pilot. The one of these is to estimate the proper lead or deflection which must be assigned in order to make a hit for a given attitude, course, and speed of the target plane. As illustrated, skill is acquired in this respect by novel means which comprises in combination, a target plane, a sight having a reticule thereon through which the target plane may be observed, means for positioning the target plane slidably mounted on a rotatable arm, on a predetermined course, and at a predetermined distance from the center of rotation of said arm, means for orientating the sight in simulation of orientation of the attacking plane in aiming its guns to hit the target plane to cause the reticule in the sight to lead the target plane, and means for indicating the lead in mils. More especially, there is in combination a support including a vertical post, a pair of radially disposed arms mounted on the post for angular movement around the post as a center, an upright spindle pivoted near one end of one arm for rotation about the longitudinal axis of the spindle, a bracket mounted at the upper end of the spindle for angular movement with the spindle, a sight mounted on said bracket, a disc associated with the spindle to indicate its rotation in mils, an upright slidably mounted on the other arm for radial movement to and from the center of rotation of said arm, a target mounted on the upper end of said upright, and a disc mounted on the support, said disc having a course scale inscribed thereon.

The other one of the problems is to estimate the range, that is, the distance of the target plane from the attacking plane. Beyond 1,200 feet, accuracy falls off rapidly due to the effect of gravity on the bullet and since there is a tendency for inexperienced pilots to open fire long before the target plane is within accurate range, it is important that skill in this respect also be acquired in order to insure hits and prevent useless waste of ammunition. It is, therefore, another feature of this invention to so construct the apparatus described above, that the target plane may be moved relative to the sight to simulate the distance within and without the maximum range of accuracy, and to employ a target which in size is proportional to the size of an enemy plane seen at a corresponding distance in actual flight so that the student pilot may visually observe the relationship between the target plane and the sight for any given distance.

It is another object of the present invention to provide a means for setting up a problem of fixed gunnery deflection and range estimation to enable the student pilot to familiarize himself with the appearance of a target plane with respect to the sight when it is in the correct position to open fire.

Accordingly, in another aspect, invention resides in a means for setting up a fixed gunnery problem and solving it, wherein a target plane is arranged to be moved relative to a sight. As practiced, novelty resides in setting up a target plane opposite a conventional sight at a predetermined distance therefrom and of a size commensurate with this distance, orienting the plane to set it on a predetermined course, assigning a predetermined speed thereto according to its type, orienting the sight in simulation of the orientation of the attcking plane in aiming its guns to bring the reticule in the sight onto the target plane with the proper lead, comparing the lead established with the calculated lead, estimating the range and comparing it with the true range as indicated by said predetermined distance. The instructor then points out the student's errors in range or lead, thus enabling the student to see exactly what his error is.

The apparatus for practicing the invention as related above will now be described, with reference to the accompanying drawings, in which:

Fig. 1 is an elevational view of the apparatus of this invention;

Figs. 1a and 1b are side and top views respectively of the stationary pointer shown in Fig. 1 attached to the bottom of post 42 by clamp 74;

The apparatus which forms the subject matter of the present invention is employed for training student pilots in knowing when and where to fire in order to hit an enemy ship. Before describing this apparatus in detail, it is desirable to set forth the nature of the problem which is to be solved, the way it is actually solved, and then to point out the application of the present invention in simulating the solution of a given problem for instructive purposes.

In fighter planes, the guns are fixed in the wings of the plane and the guns are aimed at the target by aiming the plane. This is called fixed gunnery fire and involves two problems, namely, where to fire and when to fire. The problem of whom to fire at is concerned with the recognition of the type of enemy plane and will not be considered in the present application, except to say that the pilot should already be familiar with the various types of planes in the theater of operation with which he is concerned, their speeds at given attitudes, and their size since these data are necessary to the fighter pilot in combat and are essential to the use of the present apparatus.

Figure 4:
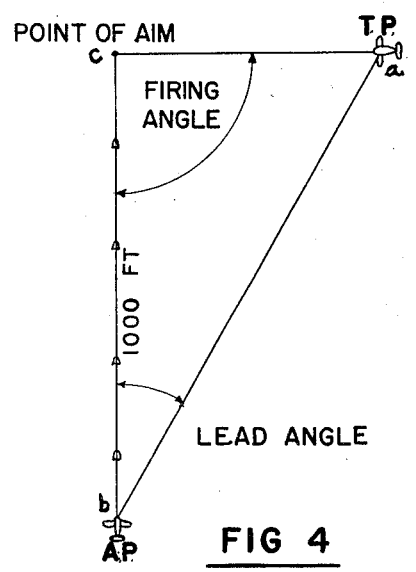
Fig. 4 is a diagrammatic view of the triangle for solving lead.
Figure 5:
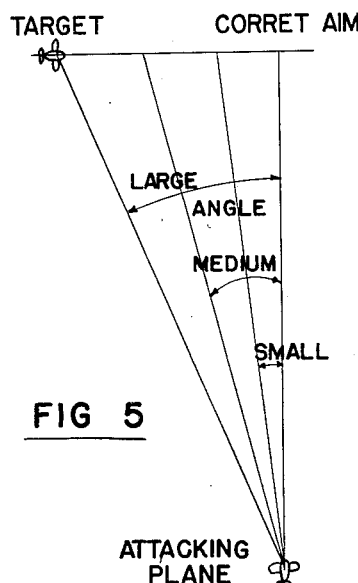
Fig. 5 is a diagrammatic view of the triangle for solving lead showing the relation between speed of the bullet and speed of the plane.
Figure 6:
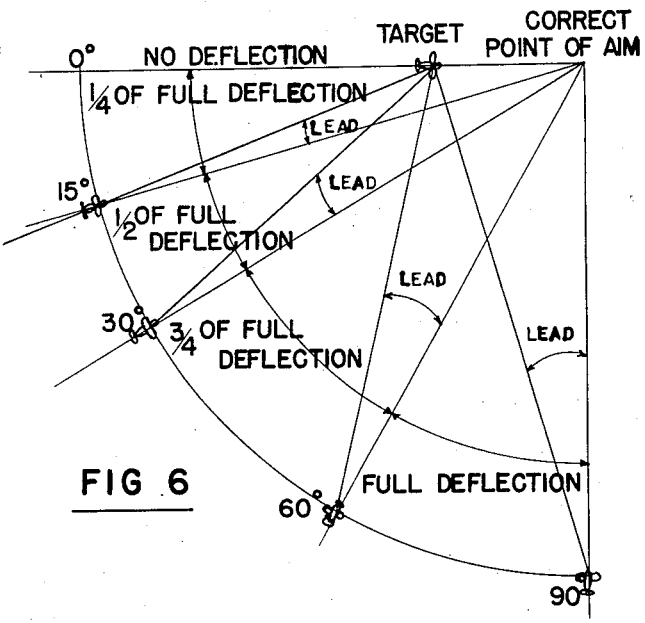
Fig. 6 is a diagrammatic view of the relation of deflection to angle of fire.

The "where to fire" brings up a problem which is familiar to most hunters, that is, to determine the amount of lead which should be employed to hit a target which is moving rapidly in any given direction with respect to him at the time of firing. This problem has been worked out as follows: The average velocity of a bullet, as fired from the type of gun mounted in the wings of our fighter planes during the first thousand feet of travel, is known to be approximately 2,500 feet per second, hence it takes about $\frac{1}{10}$ of a second to go the first thousand feet. Beyond a thousand feet, the effect of gravity on a bullet is so pronounced that accuracy of fire is diminished to the point where it becomes inadvisable to fire. For this reason, the problem may be limited to firing at an enemy plane at a thousand feet or less. Considering the problem for solving the lead which must be employed and referring to Fig. 4 for an illustration of this, the target plane TP may be considered to be at point c and the attacking plane AP may be considered to be at point b. Now if the target plane TP is traveling at 250 knots and the attacking plane fires a bullet directly at it, the bullet will miss because it takes $\frac{1}{10}$ of a second for the bullet to travel 1,000 feet, that is, from b to c, and in that time the target plane TP will have traveled 169 feet to the left of the point c. Hence, in order to hit the target plane TP the pilot should manipulate his plane AP until the pipper, that is, the center of his sight, is coincident with the point c, when the target plane TP is at the point a, that is, lead the target plane by the distance a—c. If the points, a, b and c are joined, it will be seen that a triangle exists. The angle at b is the deflection, the lead angle or simply lead in mils. The significance of this latter term will be clear from what follows. The angle at c is called the firing angle. Fortunately, the lead angle b remains constant at any range for any one firing angle and target speed, that is, if the time of travel of both the bullet and target are proportionately doubled or halved, the firing angle does not change, because the target's travel time is changed in the same proportion as the bullet's travel time. This simple fact gives the advantage of having the amount of lead in mils, which in a given target, remain the same regardless of the range. Thus the speed of the target and the angle from which the bullet is fired at the target are the only two variables which must be considered. The relation between the variables is simple and is such that for a constant bullet speed, an increase in the speed of the target results in an increase lead and vice versa (Fig. 5). Likewise, if the angle of fire at the target is changed the lead angle will change (Fig. 6). As will be seen by reference to Fig. 6, the greater the firing angle up to ninety degrees, the greater the amount of lead.

Figure 7:
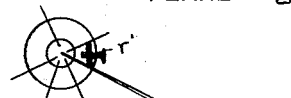
Fig. 7 is a perspective view of the line of sight between the pilot, sight and target plane.
Figure 8:
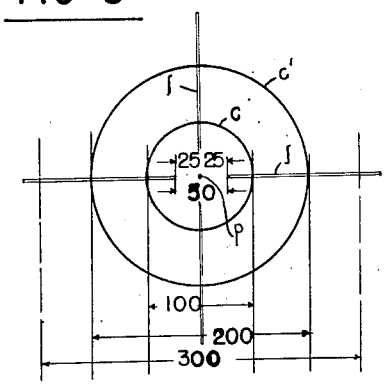
Fig. 8 is a diagrammatic view of the sight reticule showing the mil relationship between the circles and radiating lines.

While the problem of lead may appear to be somewhat complicated, it is conveniently taken care of by use of the Mark VIII reflector gun sight and a few simple rules which will now be described. The Mark VIII gun sight is conventional and is shown in Fig. 7 as comprising essentially, a piece of transparent glass g through which the target is visible and which has cast thereon the image i of a reticule r which is reflected by the glass on to the pilot's eye e in such a manner that the pilot sees a reticule r' way out in space, hanging over the observed enemy plane TP. The optical system employed in this sight need not be described except to say that this optical effect is accomplished in the same manner that a nearby object is made to appear distant when viewed through the wrong end of a pair of binoculars. The reticule r which is reflected on the glass g, as shown in Fig. 8, consists of a pipper, or center p, concentric circles c, c' surrounding the pipper at the center and radiating lines l. These circles and lines have a definite arrangement which serve as a measure of lead or range. The unit of measure taken is the mil which is the angular distance between two imaginary lines radiating from a point and extending 1,000 feet where they terminate at the opposite ends of another imaginary line one foot long. Hence, at a range of 1,000 feet, if the line of sight is shifted from one point to another by an angular distance of one (1) mil, the second point is 1 foot away from the first point. With this relationship established, the sight is built so that the radial distances between the pipper p and concentric circles c, c' are a given number of mils. Referring to Fig. 8, the mil distance radially from the pipper p outwardly is indicated as 25 mils from the pipper to the inner ends of the radiating lines, 25 mils from the inner ends of the radiating lines to the first circle c, 50 mils from the first circle c to the second circle c' and 50 mils from the outer circle c' to the outer ends of the radiating lines l. Now it has been found that on a right-angle approach to the target, such as is illustrated in Fig. 4, the relationship between the speed of the target plane TP in knots and the lead in mils is approximately 3 to 2. This relationship is known as the ⅔ rule, that is, lead-angle in mils equal ⅔ of target speed. By knowing the ⅔ rule and the speed of the target plane in knots, the lead quickly may be determined. For example, if the speed of the target plane is 150 knots, it is only necessary to manipulate the attacking plane until the pipper p leads the target plane TP by 100 mils, that is, the target plane should be bisected by the outer one of the concentric circles c'. The ⅔ rule is calculated for firing at a maximum deflection, that is, when the attacking plane is traveling at right angles to the path of movement to the target plane, however, when the attacking plane is traveling at some other angle to the target plane, the lead will be proportionately lower. By referring to Fig. 6, it is to be seen that when firing at an angle of 90 degrees, a full deflection, and hence a maximum in lead is used, and when firing at an angle of 0°, there is no deflection, and hence no lead is necessary. Between these limits, no direct proportion exists, but the deflection has been worked out empirically so that for all practical purposes from 60° to 90° a full deflection is used, from 30° to 60° a three-quarter of full deflection is used, from 15° to 30° one-half of full deflection is used, and from 0° to 15° a quarter of full deflection is used. Therefore, once the deflection is determined, it may be divided to get the proper lead in mils for a given angular approach.

The sight, as heretofore indicated, also provides means for estimating the range of the plane since as pointed out, the distance between the pipper p, the inner ends of the radiating lines l and the distance between the concentric circles c, c' is in mils which represent definite measurements in feet at a 1,000 foot range. Hence, when a plane which is known to have a 50 foot wing spread subtends, for example, the distance between the two concentric circles c, c' (Fig. 8), the pilot is immediately informed that the plane is at a distance of 1,000 feet from him. If the wing span subtends greater or lesser radial distance on the reticule, the pilot will know that the plane is proportionately closer or further away.

Figure 1:
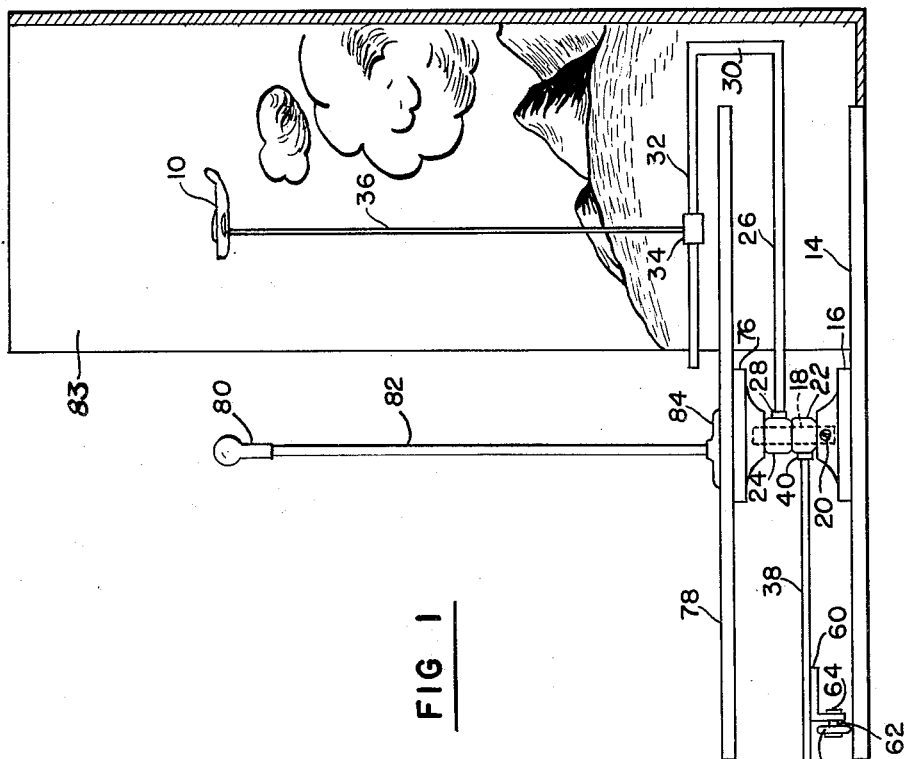
Figures 1A, 1B:
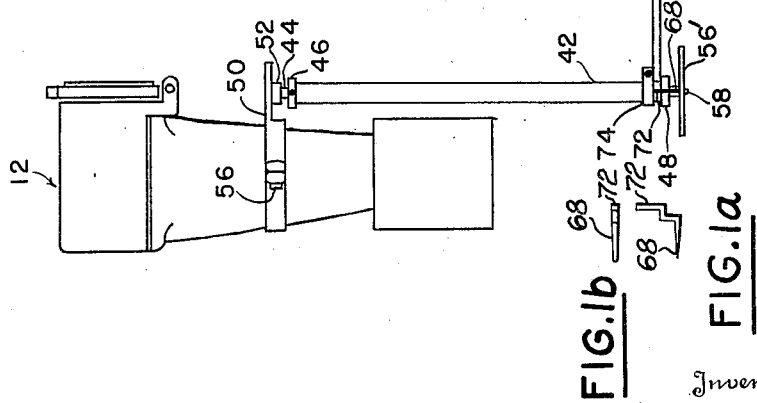
Figure 3:
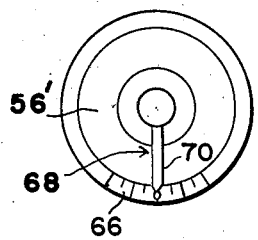
Fig. 3 is a plan view of the mil scale.

The two problems set forth above can be demonstrated for instructive purposes by use of the apparatus shown in Fig. 1, which comprises in general, a target 10 and a sight 12 mounted on a platform 14 for movement relative to each other in such a manner as to simulate conditions which would be met in actual flight. As illustrated herein, the platform 14, provided for supporting the target 10 and sight 12 for relative movement with respect to each other, has fastened thereto, a circular base 16 having a vertical post 18 fixed therein by a set screw 20. A pair of collars 22 and 24 are rotatably mounted on the post 18. The upper one of these collars 24 has threaded into it, a radial horizontally disposed rod 26 which is fastened rigidly in place by nut 28. The outer end of the radial arm 26 has an upwardly extending portion 30 and a horizontal radial inwardly extending portion 32. A sleeve 34 is slidably mounted on the portion 32, and has fastened thereto, an upwardly extending spindle 36 to the upper end of which may be fastened the target 10. Thus the target may be moved radially with respect to the center of rotation of the rod 26 and angularly through approximately 360° so that speed and course respectively of the target may be varied at will in order to demonstrate different conditions. A plurality of targets are provided so that they may be changed from time to time to illustrate different types of planes and the size employed at any given time will be selected to be in proportion to the distance scale used in the apparatus. The lower one of the collars 22 has also fastened thereto a horizontal radially disposed arm 38 by a nut 40. This arm is turned on the pivot post 18 to vary the firing angle for different problems. To the outer end of the arm 38 there is fastened a vertical tube 42 and in this tube there is disposed a spindle 44, the latter being retained therein against longitudinal displacement by a pair of collars 46 and 48 fastened near the opposite ends of the tube to the spindle. The upper end of the spindle 44 is threaded and adapted to receive a bracket 50 which is rigidly secured to the threaded end of the spindle 44 by a nut 52. The bracket 50 includes a split collar which surrounds the body of the sight 12 and is clamped thereabout by a nut 56. It is evident by this construction that the sight 12 can be rotated with the spindle 44 about the axis of the spindle 44 as a center and also radially about the axis of rotation of the post 18. At the lower end of the spindle 44 there is secured a disc 56', a screw 58 being employed for this purpose, the screw being threaded into the lower end of the spindle 44. The disc 56' (Fig. 3) has inscribed on its upper surface a scale 66 which is graduated in mils so that rotation of the sight through an angular distance of one mil will move a pointer 68 over the scale one division. The pointer 68 has a horizontal portion 70 which lies parallel to the surface of the disc 56' and a vertical portion 72 (Fig. 1) which is fastened to the tube 42 by a collar 74. In order to support the weight of sight 12, a roller 60 is provided which is mounted on a stub shaft 62, fastened to a bracket 64, the bracket in turn being fastened to the under side of the arm 38.

Figure 2:
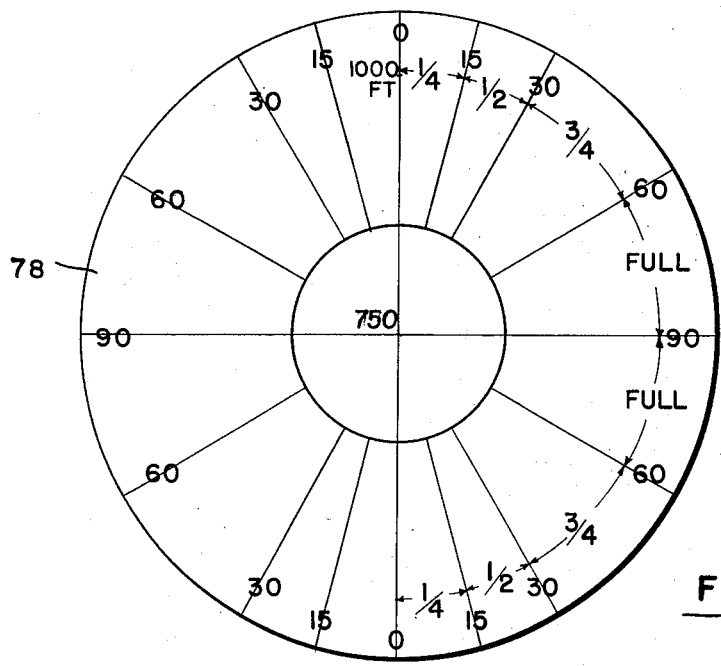
Fig. 2 is a plan view of the deflection scale.

As heretofore pointed out, the target plane is arranged to be preset on a given course by swinging the rod 26 about the post 18, and to facilitate setting the course of the plane and to determine what proportion of the full deflection is to be used in calculating the lead, there is provided a platform 78 (Fig. 2) rigidly fastened to the upper end of the post 18. The upper surface of the disc 78 has inscribed therein a scale marked off radially to represent in each quarter thereof, the full deflection which is marked 90°, and no deflection which is marked 0°. Between these limits, there are inscribed ¼, ½ and ¾ marks, representing angles of 15°, 30° and 60°. There may in addition also be a range scale inscribed on this disc as shown in Fig. 2 graduated in feet from 0 at the sight to 1,000 feet opposite the sight on the disc for the purpose set forth below.

In fixed gunnery, the guns are preset so that their lines of sight converge at a given point out in front of the plane. At this point of convergence, the bullets come closest together, that is, make the most concentrated pattern, and hence, are most effective. Beyond that point they diverge, and hence, become less effective. The effectiveness of the bullets in destroying an enemy plane is greatest at a distance of approximately 750 feet from the muzzle of the guns and diminishes on either side of this point. In order to assist the pilot in visualizing the bullet pattern at the best range, there is provided a device which may be mounted on the disc 78 and moved about thereon visually to illustrate the bullet pattern at a distance of 750 feet. This comprises a ball 80 mounted at the top of a spindle 82, the latter being fixed at its lower end to a base 84. The ball 80 is of such size that it will represent a bullet pattern at 750 feet. Ball 80 may be positioned on disc 78 at any point to indicate the bullet pattern at a specified range, utilizing the range scale referred to above for the purpose. When, therefore, a student pilot places it at the center of the disc 78, the center of which is at a distance of 750 feet from the sight and the student observes the ball through the sight, he will see what the bullet pattern looks like, at the best possible range and when it is most effective.

To make the apparatus realistic, although not essential thereto, there may be provided a semi-circular screen, as shown herein in Fig. 1 at 83, which may be placed about that portion of the apparatus opposite the sight, having painted thereon, mountains, ranges, sky and clouds, so that the target plane is seen against this as a background.

It is apparent from the description of the apparatus that it may be used as follows: The instructor may remove the spindle 82 and set the arms 26 and 38 on the 0° axis of disc 78 the center of which is placed over post 18. Arm 38 may represent a distance to scale of 750 feet so as to maintain the sight 12 at this distance from the center of the disc, this scalar distance being indicated on the 0° axis of the chart from the sight 12. The spindle 36 may then be set at a given distance from the center of the disc on portion 32 which is marked off in a scale of target speeds and will correspond in this position to the position that the selected target must occupy in order that the target would travel to the center of disc 78 in the time that it would take the bullet to travel from sight 12 to the center of disc 78 and the position of spindle 36 on portion 32 corresponds to the distance $a$—$c$ in Fig. 4. Thus, since the distance between sight 12 and the center of disc 78, or distance $b$—$c$, is fixed, the distance between spindle 36 and the center of disc 78 or distance $a$—$c$, is directly proportional to the speed of the selected target, and the scale on portion 32 may be calibrated in terms of speed. The wing spreads of the models used as targets, of course are proportioned so as to represent the proper width when viewed through the sight. Thus, assuming that the plane selected as the target is known to have a 50 foot wing spread, and that the sight 12 and target 10 are aligned with the target 10 positioned directly above the 1000 foot range marker on disc 78, target 10 will then subtend the distance between the inner ends of lines $l$ when viewed through sight 12. Of course, if target 10 is moved closer to sight 12, the representation of the target on sight 12 will become proportionally larger. Having selected the target and positioned spindle 36 on portion 32 the proper distance from the center of disc 78, the instructor may then adjust the apparatus for any selected course of flight of the target relative to sight 12. This may be accomplished in one of two ways, either by rotating arm 26 about post 18, in which case sight 12 remains fixed, or by rotating arm 38 about post 18, in which case target 10 remains fixed. The advantage of having both adjustments resides in the fact that the position of sight 12, and therefore the student, may be either fixed or variable, and in the case where screen 83 is utilized, the scene viewed by the student for any given relative position between the sight and target may be altered. The course setting is facilitated by the scale which is marked off in quarters and subdivided into 15°, 30° and 60° divisions. Having set up the apparatus for a given problem, the student takes up a position behind the sight, and, knowing the speed of the plane from observation of its type, endeavors to move the sight by rotation about the spindle 44 to cause the pipper $p$ to lead the plane by the proper amount in mils to obtain a direct hit. At the same time knowing the size of the target plane he examines its position with respect to the sight and estimates its range. After having done this, he examines the disc 56' to see whether the lead he did put in in accordance with the range observed by him was accurate, whereupon he may correct the lead, and again look at the target to see wherein he was in error. If the student has set sight 12 properly, pointer 68 will indicate 0 on scale 66 of disc 56', while any errors on either side of the correct position will be indicated in mils on scale 66. The range of the target can be computed by the instructor from the triangle formed by the target, the sight and the center of disc 78. Since one side, the distance between sight 12 and the center of disc 78 is fixed, and one other side, the distance between target 10 and the center of disc 78, is fixed for a given target, the third side, the range, is a function of the firing angle set in by the instructor, which may be read on the scale on disc 78.

This gives the student actual practice in setting in lead and range without flying.

Other problems may be set up in a similar way. For example, other types of target models may be used which are made to the same scale and set to their corresponding speeds, and their courses may be varied for practice. Also the target model may be kept at the 0° axis and the student may change the position of his location with respect thereto by turning arm 38 about the post 18 to the various deflection marks to practice setting up the proper lead angles in accordance with the relative courses to the target model.

The invention described herein may be manufactured and used by or for the Government of the United States of America for governmental purposes without the payment of any royalties thereon or therefor.

What is claimed is:

1. A device for training a pilot in estimating deflection comprising in combination, a support including a vertical post, a pair of radially disposed arms mounted on said support for angular movement around the post as a center, an upright spindle pivoted near its lower end to one of the arms for rotation of the spindle about its longitudinal axis, a bracket mounted at the opposite end of the spindle for angular movement with the spindle, a sight mounted on said bracket, an upright member slidably mounted on the other arm for radial movement to and from the center of rotation of the arm, and a target plane mounted at the upper end of said upright member.

2. A device for training a pilot in estimating deflection comprising in combination a support including a vertical post, a pair of radially disposed arms mounted on said post for angular movement around the post as a center, an upright spindle pivoted near one end of one of the arms for rotation of the spindle about its longitudinal axis, a bracket mounted at the upper end of the spindle for angular movement with the spindle, a sight mounted on said bracket, a radially disposed bar spaced parallel to the other one of said arms and forming a continuation thereof, an upright rod slidably mounted on the bar for radial movement to and from the center of rotation of said other arm, a target mounted at the upper end of said upright rod, and a disc mounted on the post, said disc having a scale inscribed thereon in degrees.

3. Apparatus for fighter pilots' use in practicing fixed gunnery aiming at enemy target planes, comprising a sighting device having a reflecting sight for throwing an image of a reticule into space on the line of sight, a post, two arms pivotally mounted on said post, a target comprising a model to scale of a known object, means for mounting said model on one of said arms for movement along the arm to varying distances from the axis of said post representing the scalar speed of said model, means for rotating said sighting device on a vertical pivot on said other arm at a fixed scalar distance from the axis of said post, and means for indicating the variation of the direction of aiming the sight from the axis of said post to show errors in aiming.

4. Apparatus for fighter pilots' use in practicing fixed gunnery aiming at enemy target planes, comprising a sighting device having a reflecting sight for throwing an image of a reticule into space on the line of sight, a post, two arms pivotally mounted on said post, a target comprising a model to scale of a known object, means for mounting said model on one of said arms for movement along the arm to varying distances from the axis of said post, means for rotating said sighting device on a vertical pivot on said other arm at a fixed scalar distance from the axis of said post, means for indicating the variation of the direction of aiming the sight in mils from the axis of said post to show errors in aiming, and a table fixedly mounted on said post and having angular scale indications marked thereon radially from the vertical axis of said post.

5. Apparatus for fighter pilots' use in practicing fixed gunnery aiming at enemy target planes, comprising a sighting device having a reflecting sight for throwing an image of a reticule into space on the line of sight, a post, two arms mounted for pivotal movement about said post, a target comprising a model to scale of an airplane, means for mounting said model on one of said arms for movement along the arm to varying distances from the axis of said post, means for rotating said sighting device on a vertical pivot on said other arm at a fixed scalar distance from the axis of said post, means for indicating the variation of the direction of aiming the sight in mils from the axis of said post to show errors in aiming, and a table fixedly mounted on said post and having angular scale indications marked thereon radially from the vertical axis of said post.

6. Apparatus for fighter pilots' use in practicing fixed gunnery aiming at enemy target planes, comprising a sighting device having a reflecting sight for throwing an image of a reticule into space on the line of sight, a post, two arms pivotally mounted on said post, a target comprising a model to scale of an airplane, means for mounting said model on one of said arms for movement along the arm to varying distances from the axis of said post, means for rotating said sighting device on a vertical pivot on said other arm at a fixed scalar distance from the axis of said post, means for indicating the variation of the direction of aiming the sight from the axis of said post to show errors in aiming, a table fixedly mounted on said post and having angular scale indications marked thereon radially from the vertical axis of said post, and a speed scale on said one arm by which to set the scale model in accordance with its speed relative to the bullet speed represented by the distance of the sight mounting from the axis of the post.

7. Apparatus for fighter pilots' use in practicing fixed gunnery aiming at enemy target planes, comprising a sighting device having a reflecting sight for throwing an image of a reticule into space on the line of sight, a post, two arms pivotally mounted on said post, a target comprising a model to scale of an airplane, means for mounting said model on one of said arms for movement along the arm to varying distances from the axis of said post, means for rotating said sighting device on a vertical pivot on said other arm at a fixed scalar distance from the axis of said post, means for indicating the variation other arm at a fixed scalar distance from the axis of said post to show errors in aiming, a table fixedly mounted on said post and having angular scale indications marked thereon radially from the vertical axis of said post, a distance scale in scalar feet on said table by which to set the scale model in practicing range estimation, and a sphere of scalar dimensions representing the bullet pattern at the best and most effective range having a standard for placing it at the corresponding range on the table for visual instruction.

8. Apparatus for fighter pilots' use in practicing fixed gunnery aiming at enemy target planes, comprising a standard sighting device having a reflecting sight for throwing an image of a reticule into space on the line of sight, a post, two arms pivotally mounted on said post, a target comprising a model to scale of an airplane, means for mounting said model on one of said arms for movement along the arm to varying distances from the axis of said post, means for rotating said sighting device on a vertical pivot on said other arm at a fixed scalar distance from the axis of said post, means for indicating the variation of the direction of aiming the sight from the axis of said post to show errors in aiming, and an arcuate screen providing back drop scenery placed behind the model plane to better simulate actual conditions.

9. Apparatus for training a pilot in fixed gunnery aiming practice comprising a sight, a post, two arms pivotally mounted on said post for movement about the axis of the post, a target comprising a model to scale of a known object carried by one of said arms, said model being movable along said arm toward and away from the axis of said post, means to rotatably support the sight on the other of said arms in spaced relation to the post, and means to indicate the angle of rotation of the sight with relation to its supporting arm.

10. Apparatus for training a pilot in fixed gunnery practice comprising a support, a target comprising a model to scale of a known object, means mounting the model for angular and linear movement with relation to said support, a sight through which the model is to be observed, means to mount the sight for angular movement with respect to said support about spaced parallel axes one of which is the same as the axis of angular movement of said model mounting means, and means to measure the angular movement of the sight about the other axis.

11. A device for training a pilot in estimating deflection in fixed gunnery aiming practice comprising in combination, a sight having means for projecting the image of a reticle in space on the line of sight, means for supporting said sight for rotation about its own axis and about an axis parallel thereto, a target comprising a small model to scale of a known object, means for supporting said model for angular and linear movement with respect to said parallel axis, a distance scale on the last-mentioned supporting means for presetting the target with respect to said parallel axis in accordance with the assumed speed of the target, and means for indicating the amount of rotation of said sight about its own axis.

ALFONSO J. RUIZ.
SYDNEY C. JAMIESON.

REFERENCES CITED

The following references are of record in the file of this patent:

UNITED STATES PATENTS

| Number | Name | Date |
| --- | --- | --- |
| 2,335,257 | Binks | Nov. 30, 1943 |
| 2,364,070 | Haile | Dec. 5, 1944 |
| 2,364,720 | Jones | Dec. 12, 1944 |

Certificate of Correction

Patent No. 2,519,402 August 22, 1950

ALFONSO J. RUIZ ET AL.

It is hereby certified that error appears in the printed specification of the above numbered patent requiring correction as follows:

Column 2, line 49, for "attcking" read *attacking*; column 10, line 24, strike out "other arm at a fixed scalar distance" and insert instead *of the direction of aiming the sight*;

and that the said Letters Patent should be read as corrected above, so that the same may conform to the record of the case in the Patent Office.

Signed and sealed this 21st day of November, A. D. 1950.

[SEAL]

THOMAS F. MURPHY,
*Assistant Commissioner of Patents.*